June 28, 1949.  R. W. MORTENSEN  2,474,489
ROCKER MOUNTING FOR ROTARY BEARINGS
Filed Feb. 7, 1946  2 Sheets-Sheet 1
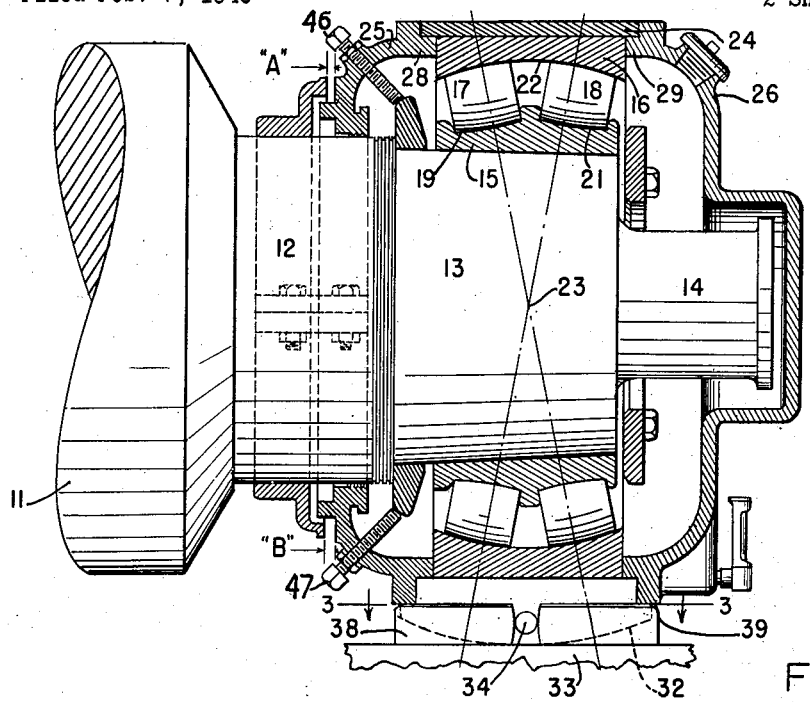
FIG. 1
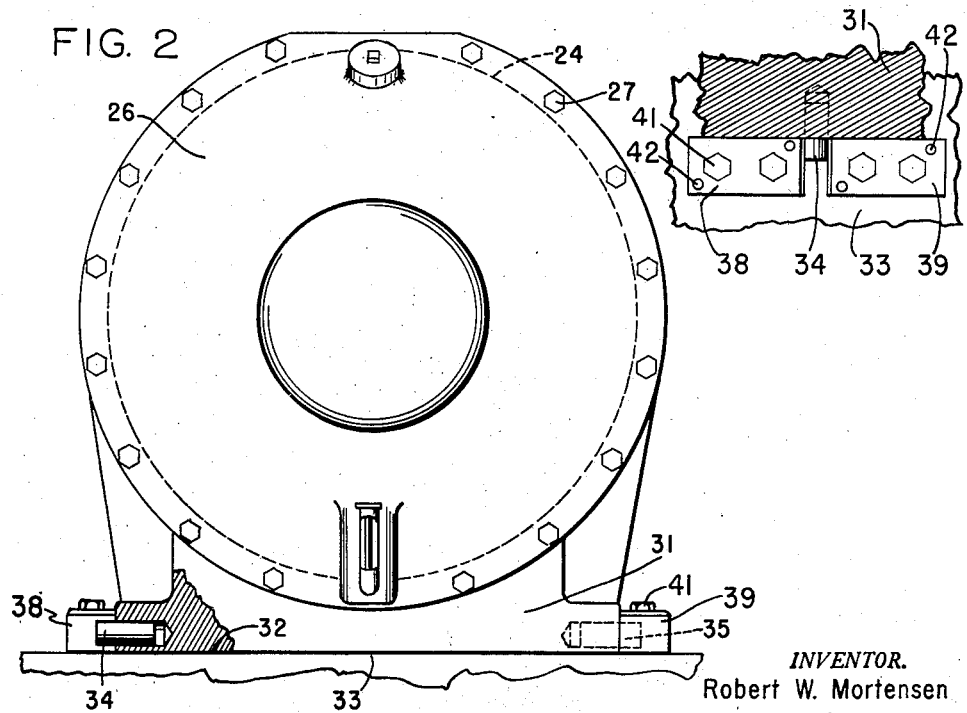
FIG. 2
FIG. 3
INVENTOR.
Robert W. Mortensen
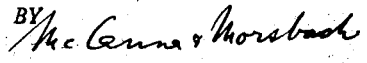
Attorneys

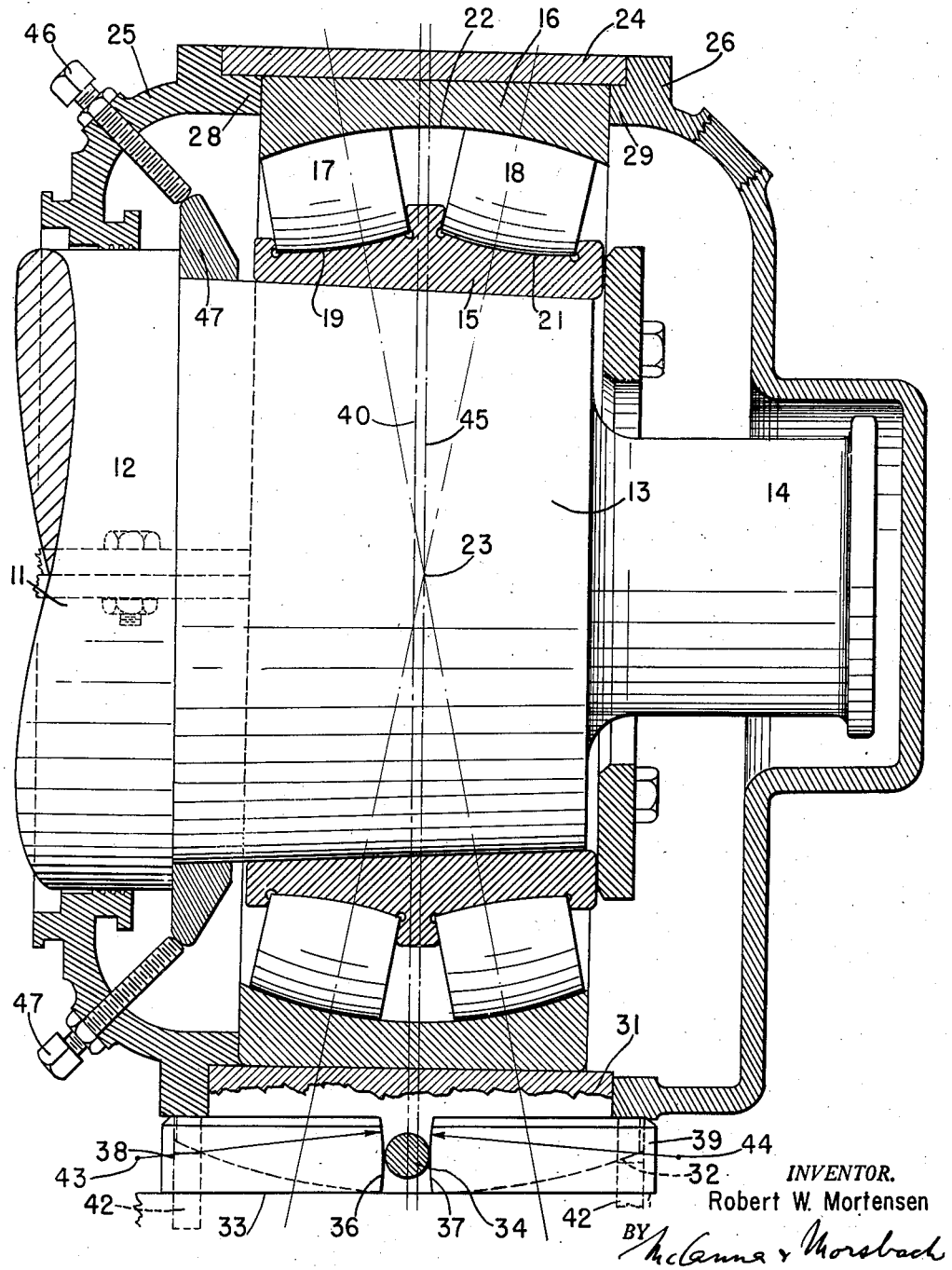

Patented June 28, 1949

2,474,489

UNITED STATES PATENT OFFICE 2,474,489

ROCKER MOUNTING FOR ROTARY BEARINGS

Robert W. Mortensen, Beloit, Wis., assignor to Beloit Iron Works, Beloit, Wis., a corporation of Wisconsin Application February 7, 1946, Serial No. 645,994

4 Claims. (Cl. 308—207)

This invention relates to mountings for rotary bearings.

The invention while of general application, is particularly intended for the bearing mountings of rolls and cylinders used in paper making machines and the like where load pressures sometimes reach one hundred tons per bearing and where provision must be made for axial displacement of the rotating member due to expansion and contraction incident to heating of the roll or cylinder as a function of its work. Heretofore it was common to take care of this expansion by allowing the outer race member to slide within its housing. However, due to varying conditions this method is not satisfactory because the bearing race sometimes becomes stuck in the housing. This may be due to improper clearances, lack of lubrication, or to the magnitude of load applications wherein the extremely high pressure between the outer race and the housing is so great that sliding is nearly impossible. Under such conditions the action necessary to cause the outer race to slide in the housing would result in increased load thrusts which overload the bearing to a point of failure. Also, such expansion under defective or excessive conditions has been known to cause the bearing housing to be torn from its mounting. In another type of prior bearing mounting the whole bearing housing is intended to slide on its base or mounting, but the shortcomings of this method are the same as described.

The present invention provides what I believe to be a satisfactory solution of the problem.

My invention contemplates a new type of bearing mounting wherein expansion of the character described is compensated for independently of the bearing loads and without imposing excessive thrust on the bearings. In the present illustration of the invention applied to what is termed the front bearing of a roll or cylinder, the opposite end of the roll or cylinder is supported in a bearing housing and the bearing is mounted rigidly with respect to the machine base so that no axial movement can take place. According to my invention, said front bearing mounting is characterized by the provision of a bearing housing having a rocker mounting on the base and having a spherical support for the bearing arranged so that the housing and the bearing will have rocking actions to compensate for the axial displacement of the roller, as described more fully hereinafter.

Another object of my invention is to provide a rocker mounting for rotary bearings operating on a novel principle.

Another object of my invention is to provide a bearing mounting of the character described designed so that it is capable of manufacture at a reasonable cost and so that it will satisfactorily perform the purposes intended.

Other objects and attendant advantages will be apparent to those skilled in this art as the invention becomes better understood by reference to the following description when considered in connection with the accompanying drawings, in which:

Figure 1 is a vertical section longitudinally through a bearing mounting embodying my invention;

Figure 2 is an end view of the mounting, partly in section;

Figure 3 is a fragmentary section taken substantially on the section line 3—3 of Figure 1; and Figure 4 is an enlarged section similar to Figure 1 but showing somewhat diagrammatically the tilting or rocking action as an incident to axial expansion of the roll of cylinder.

The illustrative embodiment shown in the drawings utilizes an anti-friction bearing of the type having spherical shaped rollers which roll directly on an outer race of spherical configuration to provide for the tilting or oscillating action above mentioned. However, my invention contemplates the use of other types of anti-friction bearing such, for example, as plain cylindrical rollers between inner and outer races with the outer race member seating on a spherical surface to provide for the tilting or oscillating movement referred to. In this embodiment only the free expanding end of the roll or cylindrical trunnion is provided with a rocker type mounting according to my invention, it being well known that the trunnion at the opposite end of the roll is journalled in a mounting which is stationary on the base of the machine and holds this end of the roll or cylinder in a fixed location. It will be apparent, therefore, that the axial expansion and contraction of the roll or cylinder as a consequence of heating results in axial displacement of the opposite journalled end. It is this displacement which my invention takes care of without imposing objectionable or detrimental strains or load thrusts on the bearings.

The roll designated generally by 11 is of a design well known in paper calendering machines, having, in this instance, a cylindrical portion 12, a tapered portion 13 and a stud end 14, the latter being for the purpose of hoisting and handling. As here shown, the anti-friction bearing comprises an inner race member 15 fixed by a pressed fit or otherwise to the tapered portion 13, an outer race member 16, and two sets of anti-friction rollers 17 and 18. It will be observed that the sets of rollers 17 and 18 are retained in separate inner raceways 19 and 21, respectively, and that the peripheral surface of each roller conforms to and rolls on a spherical raceway 22 formed in the outer race member 16. The center of this spherical raceway 22 is coincident with the center axis of the roll and disposed midway between the ends of the race member, as noted at 23. The outer race member 16 is fixed in an annular housing part 24 which preferably includes an inside bearing cover 25 and an outside bearing cover 26. The housing members 25 and 26 are suitably fixed to the intermediate housing member 24, as by bolts 27. In this instance, the housing members 25 and 26 have flanges 28 and 29, respectively, which clamp against the outer race member 16 and fixedly secure this outer race member to the composite housing structure. In this embodiment the inner bearing cover 25 is composed of upper and lower half sections bolted together at the center, as indicated in dotted lines in Figures 1 and 4. The outer cover may enclose the entire outer end of the bearing and roller, as shown.

It will be observed that the lower end portion 31 of the housing member 16 is shaped to provide a rocker face 32 on an arc struck from the center 23. This surface extends transversely of the bearing to provide a wide cylindrical bearing face which rests on a flat horizontal supporting surface 33 which in turn is stationary with respect to the machine. The entire weight on the roll at this end is carried through the cylindrical portion 32 through its seat against the support 33. It will now be observed that the bearing housing is capable of a rocking motion on its rocker surface 32 and that this motion of the housing is confined at its lower end substantially against displacement axially of the roll. This restraining function may be obtained in a number of different ways. In the present embodiment I provide the rocker portion 32 with oppositely extending guide pins 34—35, the projecting ends of which are disposed between the guide surfaces 36—37 of guide bars 38 and 39, respectively. These guide bars are suitably fixed to the base on the machine by bolts 41. Suitable locating dowels 42 are provided to accurately locate the guide bars on the base. The guide surfaces 36 and 37 are on arcs struck from centers 43 and 44, respectively, calculated to allow a true rolling action by preventing any appreciable displacement of the rocker housing at its lower end in a direction axially of the roll.

This construction permits of axial movement of the free end of the roll as a consequence of expansion and contraction of the roll, together with novel compensation for this movement without increasing the thrust load on the bearing to any objectionable degree. This rocker movement and compensating action is as follows: When the roll expands, that is, moves outward to the right in Figures 1 and 3, the tendency is to cause the front bearing center to move outward, increasing the center to center of the front and rear bearings, slightly. With the back bearing rigidly mounted as described, this outward movement of the front bearing actually takes place. Such outward movement of the bearing center is here illustrated in Figure 4 as from the plane 40 to the plane 45. However, this movement of the bearing includes a compensated movement by reason of the mounting of the several parts. That is to say, this forward movement of the front bearing portion 13 positively and directly moves with it the inner race member 15 and the roller sets 17 and 18. This movement imposes a thrust through the rollers against the spherical bearing face 22 which causes the outer bearing housing to rock on its surface 32, guided by its pins 34—35. This rocking action causes the center of the rocker radius to move with the center line of the bearing, these centers being coincident as designated by 23. However, the elevation of the center line of the roll above the base remains the same because of the fact that the radius causes every point of the curved rocker portion to be equi-distant from the intersection of the roll and the bearing center line. Thus, the rocking of the bearing housing will result in the housing and the outer race member as a unitary structure, being slightly "tipped" or oscillated with respect to the roll. This tipping is compensated for in the bearing by reason of the spherical shaped outer race 22. Since the center of the bearing's spherical radius is at the intersection of the horizontal and vertical center line of the bearing and coincident with the center of the rocker radius, the tipping of the housing and outer race actually causes the outer race to rotate slightly with respect to the inner race, which latter is fixedly mounted on the roll journal. The plane of this rotation is at right angles to the plane of rotation of the roll in the bearing. This rotation allows the bearing to locate itself in what might be termed a compensating action, without otherwise interfering with the normal operation of the bearing. The action is somewhat similar to a ball and socket arrangement.

It is believed that my improved bearing mounting will function most successfully with the spherical type roller bearing or the self-aligning type of ball bearing, but it is adapted for use with any type of bearing together with a spherical seat or mounting for the bearing within the main or outer housing. Also, the front bearing housing is maintained in alignment by coaction between the several guide bars which are bolted to the machine base and are fitted closely to the adjacent ends of the cylindrical shaped base portion of the bearing housing. It will also be observed that the bearing housing is prevented from creeping in a direction parallel to the horizontal center line of the roll by reason of the guide pins 34—35 which are located between adjacent ends of the guide bars and fixed in the rocker base of the bearing housing. The guide bars are set close to the pins so that there is no freedom of forward and backward movement in the normal condition. When the bearing housing rocks on its base, as explained, the guide pins follow the path of a cycloidal curve. The ends of the guide bars are machined to conform to this curve so that the pin is free to follow the cycloidal path without binding.

In actual practice I prefer to set the bearing housing at a slight angle, inclined toward the left, viewing Figure 1, at the time of setting up the bearing. For example, with a bearing such as here disclosed, designed for a 102" super calender, the inside diameter of the bearing housing member 24 is about 32". When erecting the bearing and before putting any weight on it (while the roll is still supported on jacks), the housing is set by adjusting the set screws 46—47 so that the dimension "A" is 3/32" less than the dimension "B," as shown in Figure 1. While in this position the guide bars 38 will be bolted down with the curved face of the bar in contact with the guide pins. The guide bars 39 will then be bolted down, allowing .002" clearance between the curved end of these guide bars and the pins. When the bearing is fully erected the set screws 46—47 will be removed so that the housing is free to respond to its rocking motion, as above described. Shorter set screws (about 1¼" in length) may be inserted in place of the set screws 46—47.

While I have shown a particular embodiment of my invention, it will be understood that I do not wish to be limited thereto since many modifications may be made, and I therefore contemplate by the appended claims to cover any such modifications as fall within the true spirit and scope of my invention.

I claim:

1. A mounting for a rotary shaft which has a portion subject to axial displacement incident to its use, comprising a bearing for said shaft portion comprising an inner race, an outer race and anti-friction members therebetween, said outer race having a spherical bearing face struck from a center coincident with the center of said shaft portion, the bearing members having spherical faces conforming with the spherical bearing face of the outer race, a housing supporting the outer race, a base support for the housing having a supporting surface, the housing having an undersurface on an arc struck from said center, said undersurface resting on said supporting surface, the housing having rocking motion on said base support in response to said axial displacement of said shaft portion, a guide pin on each side of said bearing housing adjacent to its arcuate undersurface and guide surfaces fixed to the base support on opposite sides of each guide pin to confine the lower end of the bearing housing against movement in said axial direction during rocking motion of the bearing housing.

2. A mounting for a rotary shaft which has a portion subject to axial displacement incident to its use, comprising a bearing for said shaft portion comprising an inner race, an outer race and anti-friction members therebetween, said outer race having a spherical bearing face struck from a center coincident with the center of said shaft portion, the bearing members having spherical faces conforming with the spherical bearing face of the outer race, a housing supporting the outer race, a base support for the housing having a supporting surface, the housing having an undersurface on an arc struck from said center, said undersurface resting on said supporting surface, the housing having rocking motion on said base support in response to said axial displacement of said shaft portion, at least one guide pin formed on said bearing housing and spaced guide cam surfaces formed on the base support and engageable by said pin to confine the lower end of the bearing housing against relative movement in an axial direction during said rocking motion of the bearing housing.

3. A mounting for a rotary shaft which has a portion subject to axial displacement incident to its use, comprising an anti-friction bearing for said shaft portion of the type permitting tilting or oscillating of the parts relative to the shaft, a housing supporting the bearing and having an arcuate surface formed thereon, a support for the housing having a surface engaged by said arcuate surface and permitting rocking motion of said housing on said support in response to axial displacement of said shaft portion, a guide pin on said bearing housing and cam surfaces fixed to the support on opposite sides of the guide pin and engageable by the latter to prevent relative axial movement of the housing during said rocking motion of the bearing housing.

4. A mounting for a rotary shaft which has a portion subject to axial displacement incident to its use, comprising an anti-friction bearing for said shaft portion of the type permitting tilting or oscillating of the parts relative to the shaft, a housing supporting the bearing and having an arcuate surface formed thereon, a support for the housing having a surface engaged by said arcuate surface and permitting rocking motion of said housing on said support in response to axial displacement of said shaft portion, spaced cam surfaces fixed on opposite sides of said support, and guide pins mounted on opposite sides of said housing and engageable with said cam surfaces to prevent relative axial movement of the housing during said rocking motion of the bearing housing, the engagement of said pins with said cams on the respective opposite sides of the mounting being such as to prevent rotational movement of said housing about an axis at an angle to the direction of axial displacement.

ROBERT W. MORTENSEN.

REFERENCES CITED

The following references are of record in the file of this patent:

UNITED STATES PATENTS

| Number | Name | Date |
|---|---|---|
| 1,250,620 | Moysey | Dec. 18, 1917 |
| 1,904,247 | Palmgren | Apr. 18, 1933 |
| 1,953,001 | MacIver | Mar. 27, 1934 |
| 1,995,408 | Wallgren | Mar. 26, 1935 |
| 2,167,457 | Leufven | July 25, 1939 |

FOREIGN PATENTS

| Number | Country | Date |
|---|---|---|
| 442,254 | Germany | Mar. 26, 1927 |